United States Patent
Arpajian et al.

[15] 3,661,485
[45] May 2, 1972

[54] COMPRESSION MOLDING SYSTEM

[72] Inventors: Vasken F. Arpajian, Huntingdon Valley; Quentin M. White, Jenkintown, both of Pa.

[73] Assignee: Pennwalt Corporation, Philadelphia, Pa.

[22] Filed: June 10, 1970

[21] Appl. No.: 45,078

[52] U.S. Cl.................425/162, 425/208, 425/297, 425/327, 425/378, 425/449, 425/437
[51] Int. Cl..........................................B29c 3/00
[58] Field of Search..............18/16 F, 30 FM, 30 FC, 30 FG, 18/30 FH, 30 FJ, 30 FN, 30 FP, 30 FQ, 30 FR, 30 FS

[56] References Cited

UNITED STATES PATENTS 2,402,462  6/1946  Sullivan.....................18/30 FG X
3,129,463  4/1964  Gill et al.......................18/16 F
3,084,387  4/1963  Tochner et al.................18/16 F
2,566,854  9/1951  Rhodes.......................18/12 SA X Primary Examiner—H. A. Kilby, Jr.
Attorney—Carl A. Hechmer, Jr. and Stanley Bilker

[57] ABSTRACT

An automatic compression molding system, especially for thermosetting materials, in which an extrusion screw or a number of extrusion screws preplasticize the powder and charge the preplasticized mass into preforms. The preheated and preformed masses are immediately delivered and loaded into the mold cavities to reduce the time of the cure cycle up to 80 percent of that required in cold powder compression molding.

12 Claims, 10 Drawing Figures

PATENTED MAY 9 1972 3,661,485

INVENTORS
VASKEN F. ARPAJIAN
QUENTIN M. WHITE
BY Stanley Belker
ATTORNEY

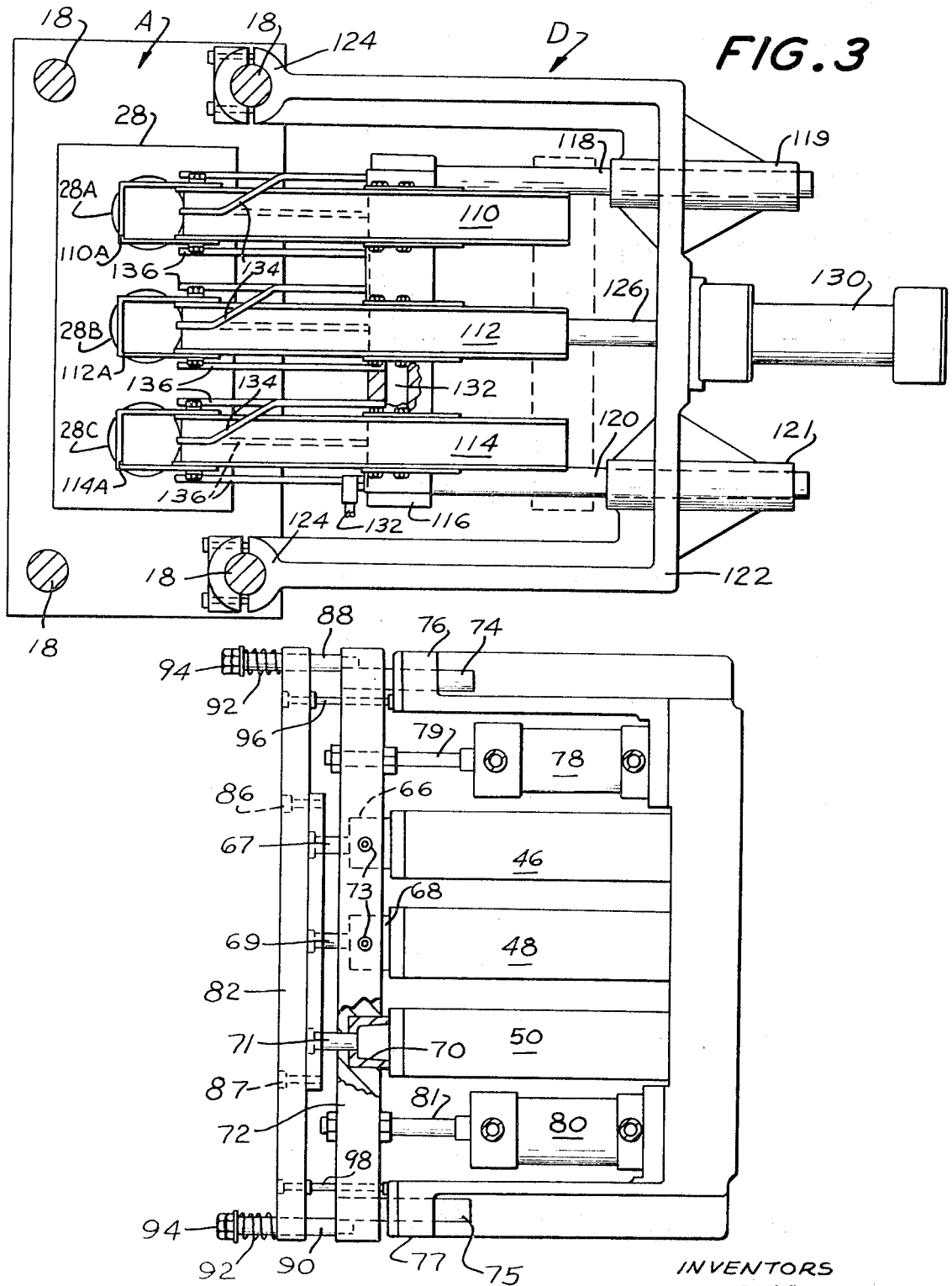
FIG. 3
FIG. 4
INVENTORS
VASKEN F. ARPAJIAN
QUENTIN M. WHITE
BY
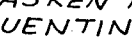
ATTORNEY

INVENTORS
VASKEN F. ARPAJIAN
QUENTIN M. WHITE
BY
ATTORNEY

COMPRESSION MOLDING SYSTEM

This invention relates to the molding of plastics, and more particularly relates to the compression molding of plastic materials, especially thermosetting resins.

In a conventional compression molding cycle, a predetermined volume of cold molding powder is delivered to the die cavity in the press and molded into the desired shape by urging a movable platen or force plate of the press into closed engagement with a stationary platen. The molding powder is usually a thermosetting resin, although thermoplastics are also compression molded on occasion where the molded parts require minimal internal strain.

One of the basic problems encountered in compression molding of cold powder thermosetting materials is the relatively long period of time of the cycle, a goodly portion of which involves the heating of the plastic to a plasticized condition, wherein it readily flows and then cures in the mold. In the past, compression molding cycle times have been reduced by preheating the raw powder using infrared lamps, high frequency radio waves and by a reciprocating screw type of extruders. With infrared heating, preheating temperatures are limited to approximately 160° F. and temperatures beyond this range usually cause handling problems by creating a tendency for sticking and excessive residence time of portions of the preheated powder. However, reduction in cure times by infrared heating methods have reduced cure times by 10 to 20 percent. While radio frequency preheating permits relatively high preheat temperatures in the order of 240° F., RF and dielectric heating equipment is quite elaborate and relatively expensive in addition to requiring a great deal of attention to keep in good operating order. Attempts to preheat by a reciprocating screw extruder have generally been more costly and did not effect sufficient preheating or plasticity of the charge delivered to the mold cavities.

It is therefore an object of this invention to provide a high production, low cost automatic compression molding machine in which large reductions in cycle times are achieved.

Another object of this invention is to provide an automatic compression molding system, especially for thermosetting resins, in which consistent strain-free parts can be molded in a minimum time.

Still another object of this invention is to provide an automatic compression molding machine in which there is no sticking problem.

Yet still another object of this invention is to provide an automatic compression molding system in which the plastic charges are preplasticized to temperatures up to 290° F. immediately prior to loading of the mold cavities.

The herein compression molding system utilizes an extrusion screw or a number of extrusion screws, basically one for each mold cavity or subcavity, which first preplasticizes the charge and then compacts the mass into a preform shape just prior to loading of the mold cavities. When a general purpose phenolic molding compound is heated to a temperature level approaching 290° F., it has an extremely short flow life before polymerization renders the material generally unsatisfactory for molding. However, by quickly loading a preformed mass of the preplasticized material into the mold cavity, advantage can be taken of the already heated mass to shorten cure time in the mold itself. As a consequence, the overall cure cycle can be reduced by as much as 80 percent of the time required for cold powder compression molding.

Other objects of this invention are to provide an improved device of the character described which is easily and economically produced, sturdy in construction; and highly efficient and effective in operation.

With the above and related objects in view, this invention consists of the details of construction and combination of parts, as will be more fully understood from the following detailed description when read in conjunction with the accompanying drawings in which:

FIG. 3 is a sectional view taken along lines 3—3 of FIG. 1.

FIG. 4 is a sectional view taken along lines 4—4 of FIG. 1.

FIG. 5 is a side sectional view similar to FIG. 5 but with the preforming die being retracted from its shaping position.

Figure 1:
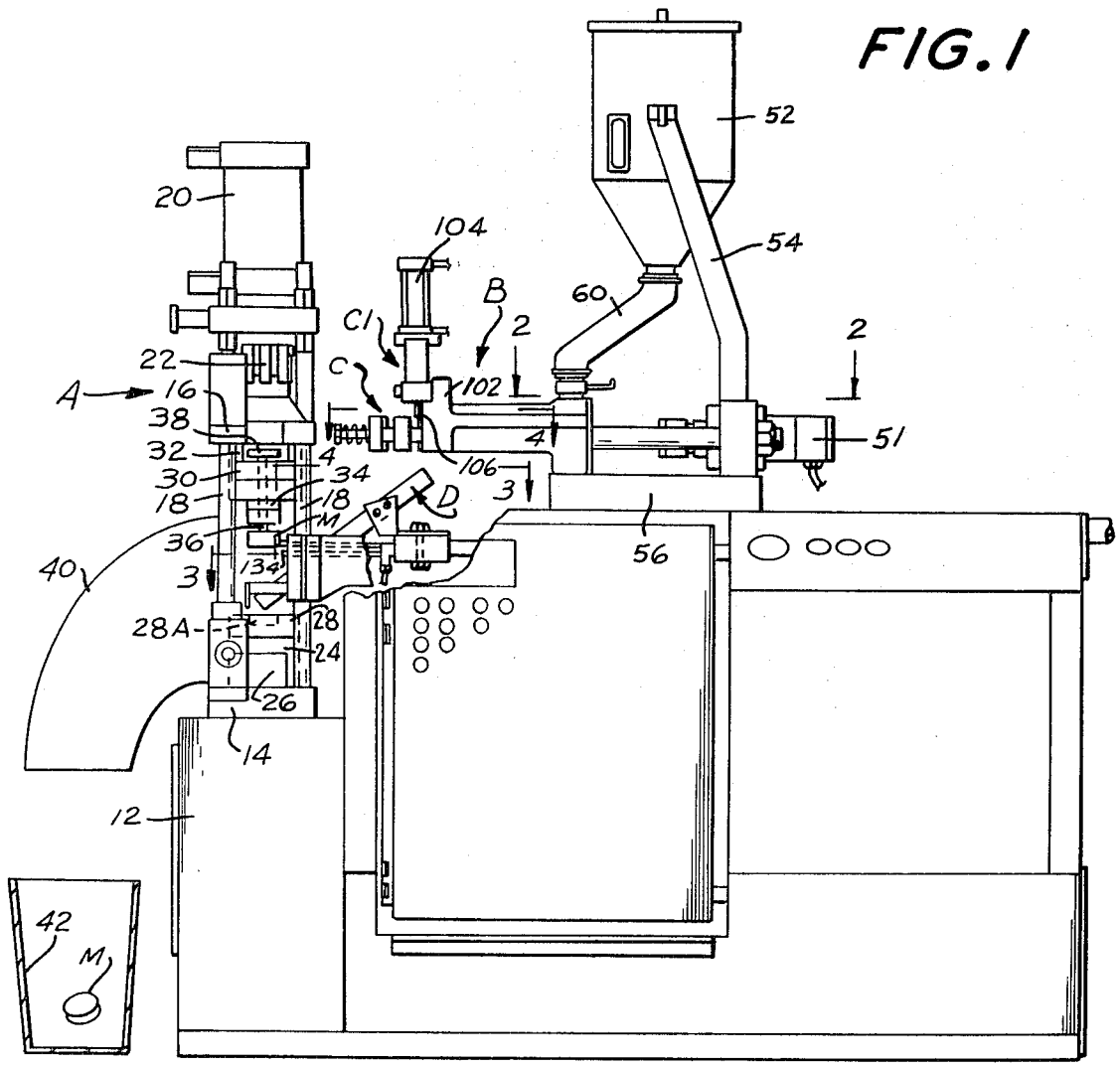
FIG. 1 is a side elevational view of an automatic compression molding press which incorporates a preplasticizing system embodying this invention.
Figure 2:
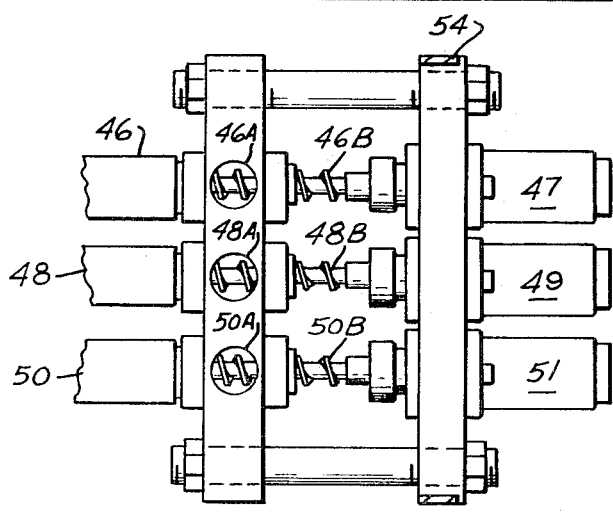
FIG. 2 is a sectional view taken along lines 2—2 of FIG. 1.

Referring now in greater detail to the drawings in which similar reference characters refer to similar parts, there is shown an automatic compression molding press for thermosetting materials comprising a molding section, generally designated as A, a plasticizing section, generally designated as B, a preforming section, generally designated as C, and a chute D for carrying formed masses of plasticized material from the preforming section C into the cavities of the molding section.

The compression molding press section A is generally conventional and includes a base 12 upon which is mounted a stationary platen 14. A movable platen 16 is vertically reciprocable upon guide posts 18 upstanding from the stationary platen 14 and is actuated by hydraulic cylinder 20 operating through toggle assembly 22. A fixed heating platen 24 is supported by legs 26 which are bolted to the stationary platen 14. Mold plate 28 having three laterally spaced cavities 28A, 28B and 28C, for example, is affixed to the top of heating platen 24. Heating platen 30 is secured to the movable platen 16 by legs 32 downwardly depending therefrom. Bolted to the heating platen 30 is an upper mold plate or force plate 34 having three plungers in alignment and cooperating with the respective cavities 28A, 28B and 28C to form simultaneously three molded components, such as radio or television knobs, from a thermosetting plastic composition, for example a phenolic resin. Ejector pins 36 suspended from pin plate 38 are slidably received within aligned bores passing through the heating platen 30, the force plate 34 and the respective plungers thereof, and are adapted to downwardly eject molded components from the upper mold plate 34 after the press has opened. Arcuate duct 40 adjustably affixed to the posts 18 defines a conduit through which the finished parts are discharged into a collection basket 42.

The plasticizing section B comprises a plurality of extrusion cylinders 46, 48 and 50, one cylinder for each mold cavity. Thermosetting resin powder is fed into the extrusion cylinders from a common hopper 52 which is suspended above the cylinders by brackets 54 anchored on bed plate 56. Flexible hose lines 60 couple the hopper 52 with the feed throats 46A, 48A and 50A of the cylinders to permit delivery of thermosetting material into the extrusion cylinders for plasticization. The extrusion cylinders include respective screws 46B, 48B and 50B which are rotatably driven at predetermined intervals by hydraulic motors 47, 49 and 51. The extrusion cylinders 46, 48 and 50 are heated in the usual manner by jacketed heated fluid mediums or electric elements (not shown) in a conventional manner. In the course of operation, the final high degree of plasticization of the material being extruded is adjustably controlled by varying the annular spacing between the conical leading edge of the screw, and the tapered front wall of the cylinder bore adjacent the orifice 62. It is to be observed that the annulus is immediately adjacent the face of the nozzle to minimize residence time and to minimize the amount of material retained in the nozzle after cut off.

The preforming section C comprises a plurality of cups 66, 68 and 70, one for each cylinder, which are horizontally reciprocable into abutting engagement with respect to the discharge ends thereof. In this regard, the extrusion cylinders have flat blunt discharge nozzles which cooperate with the preform cups to capture the plasticized material being extruded from the nozzles and form the extruded material into respective bell-shaped masses or wads. The cups 66, 68 and 70 are retained in spaced laterally disposition with respect to each other in a horizontally reciprocable transverse bar 72 which contains wells for seating the cups. Set screws 73 retain the cups in the corresponding wells. The transverse bar 72 has a pair of lateral rods 74 and 75 which are guided in respective guide block slide bearings 76 and 77. Hydraulically actuated cylinders 78 and 80 are adapted to reciprocate the bar 72 through piston rods 79 and 81. Actuation of the cylinders 78 and 80 moves the cups 66, 68 and 70 into and out of abutting disposition with the blunt nozzles of the extrusion barrels. See FIG. 4. However, it is also apparent that a single extrusion cylinder may feed a plurality of preform cups through branched manifold lines delivering plasticized material to separate orifices.

Figure 5:
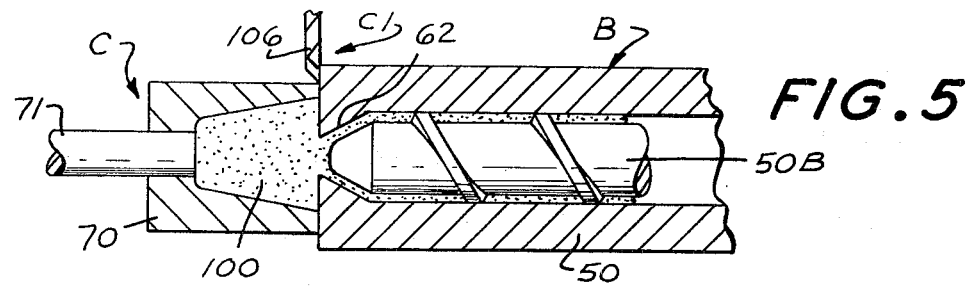
FIG. 5 is a side sectional view of the plasticizing and preforming system embodied in this invention.

Referring now to FIGS. 4 to 8, the cups 66, 68 and 70 include respective ejection fingers 67, 69 and 71 which retain the plasticized wad against the face of the extrusion nozzles upon retraction of the cups. These ejection fingers 67, 69 and 71 extend from the face of crossbar 82 and project through bores in the bases of the respective cups. Plate 84 retains the fingers 67, 69 and 71 in position against the face of ejector crossbar 82 and is held thereon by suitable bolts 86 and 87. The crossbar 82 is slidably received on end guide rods 88 and 90 which project from the distal face of cup retainer bar 72. Coil springs 92 are concentrically mounted on the guide rods 88 and 90 and are compressed between the crossbar 82 and stop nuts 94 at the ends of the guide rods to resiliently urge the bar 82 toward the transverse bar 72. Finger retraction studs 96 and 98 extend rearwardly from the face of the crossbar 82 adjacent each end thereof and project slidably through bores in the transverse bar 72. The ends of the retraction studs 96 and 98 are adapted to abut up against the bearing blocks 76 and 77 which act as stops when the transverse bar 72 is drawn toward the extrusion cylinder nozzles. Thus, when the preform cups 66, 68 and 70 are in abutment with the extrusion nozzles, as shown in FIGS. 4 and 5, the retraction studs 96 and 98 engage the stop blocks 76 and 77 so as to space the crossbar 82 apart from transverse bar 72 against the bias of the coil springs 92. The ejection fingers are accordingly drawn toward the rear of the preform cups until the tips thereof are flush with the back walls. See the position of ejection finger 71 in cup 70 as illustrated in FIG. 5. In this position, a bell shaped mass 100 of plastic material is compacted within the "Tetran" coated cup interior. When the transverse bar 72 is moved forwardly, such that the cups are withdrawn from engagement with the respective nozzles, studs 96 and 98 remain in abutment with their blocks 76 and 77 during the first portion of the stroke of transverse bar 72. The bias of the coil springs 92 thereby urges the crossbar 82 toward the transverse bar 72 during withdrawal thereof, so that the ejection fingers project into the cup cavity and press against the wad 100. Thus, when the cup 70, for example, is in the partially retracted position shown in FIG. 6, the preformed mass 100 is stripped out of cup 70 by ejection finger 71 and kept against the nozzle face of extrusion cylinder 50. Further retraction of the transverse bar 72 and its preform cups to the position shown in FIG. 7 fully exposes the formed compacted wad 100 in preparation for cut off. Attention is here invited to the fact that the size of the preform 100 is dependent solely upon the length of time that the extrusion screws 46, 48, and 50 rotate at any set speed. The cups are not required to be of the same size as the wad to be preformed but only sufficiently large to cover the largest molded part.

Figure 6:
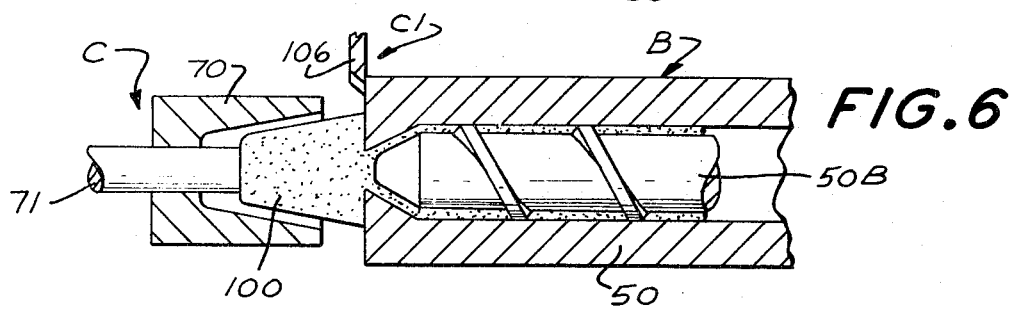
Figure 7:
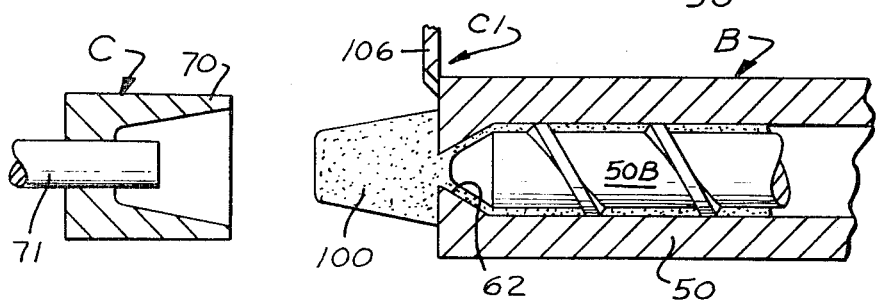
FIG. 7 is a side sectional view thereof with the preforming die completely retracted to expose the preformed mass of plasticized material.
Figure 8:
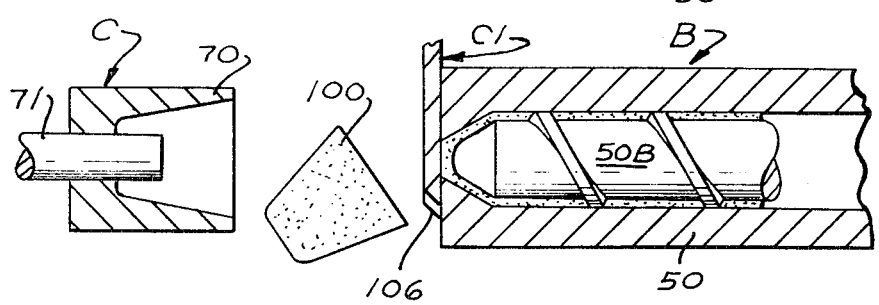
FIG. 8 is a side sectional view of the plasticizing and preforming section showing the preplasticized and formed mass of material being severed from the extrusion cylinder.

The preform section C also includes a cut-off head C1 which is adapted to shear the compacted wads or buds 100 formed on the ends of the extrusion nozzles for deposit into the chute D. The cut-off head C1 is suspended above the preform section by a frame 102. The frame 102 is mounted on the bearing guide blocks 76 and 77 and straddles the extruder nozzles. The piston of air cylinder 104 carries a guillotine knife 106 which includes blades in sliding contact with the respective faces of the extruder nozzles. Normally, the blades 106 are held in raised position above the upper level of the preform cups, as shown in FIGS. 5, 6 and 7. FIG. 8 illustrates the depressed position of the blades 106 such that the masses 100 are lopped off from the extruder nozzle and allowed to drop into the appropriate channels of the chute D.

The chute section D is best shown in FIG. 3 and essentially comprises a series of channels 110, 112 and 114 which catches the sheared off preformed masses 100 for deposit into the respective mold cavities 28A, 28B and 28C. The channels 110, 112 and 114 are integrated upon a horizontally reciprocable carriage 116 which has rearwardly extending guide rods 118 and 120. The guide rods 118 and 120 are slidably retained in slide bearings 119 and 121 carried in feed frame 122. The feed frame 122 is in the form of a yoke whose ends carry split flanges 124 which embrace the rear press columns 18. The carriage 116 is coupled to piston rod extension 126 which is horizontally advanced upon actuation of air cylinder 130. Retraction of the chute D by reverse actuation of the cylinder 130 enables the chute D to be withdrawn from between the molding platens of the press. Deflectors 110A, 112A and 114A at the discharge ends of the respective chute channels insures that the preformed masses 100 are properly charged into the corresponding mold cavities.

Extending forwardly from the carriage 116 and in communication with a compressed air manifold 132 therein are a series of tubes 134 and 136. These tubes direct a blast of air against the finished molded parts retained upon the ejection pins 36 when the molds open. The tubes 134 are at the same level as the molded parts themselves and in direct alignment therewith. If the air blast from tubes 134 and 136 does not dislodge the molded parts from the advanced ejector pins 36, during forward movement of the chute D between the open platens of the press, the rigid tubes 134 abut against the finished molded parts and physically dislodge them. Thereafter the continuing air blast then blows the molded parts through the duct 40 and cleans any residual flash or particles from the surfaces of the mold cavities.

In order to start the automatic cycle sequence, a series of preliminary steps must be undertaken so as to insure that the operating elements are in their correct position. With the press A and the extruders B both operating at their prescribed temperatures, the main hydraulic pump motor is actuated by depressing "pump start" push button 138 (line L15) thereby energizing pump motor relay M1 (line L15). The 1CM contacts in line L16 close to lock the "pump start" button across the line, thus holding the motor relay M1 until "pump stop" push button 139 is depressed. The cycle is initiated with "Man-Auto" selector switch 142 in manual position which causes the preform cups 66, 68 and 70 to close against the nozzle faces of the respective extruders 46, 48 and 50. That is, preform close solenoid S4 (line L39) becomes energized through the closed shear retract limit switch LS9 also in line L39, through the closed manual position of selector switch 142 (line L40) and through its closed manual position in line L26. With the selector switch 142 still in manual position, the " screws forward" push button 140 (contacts in lines L41, L48 and L49) is depressed thereby energizing the "screws forward" motors No. 1, No. 2 and No. 3 through the normally closed 4CR contacts in line L47 via the normally closed T2–1 timer contacts (line 48), preform close limit switch LS7 which is now in closed position in line L48, and through the closed contacts of the "screws forward" push button in line L49. Accordingly, the preform cups become charged with plasticized material from the extruders. When the cups 66, 68 and 70 are filled, the "screws forward" push button 140 is released, and the selector switch 142 turned to "Auto" position. Since the "preform close" solenoid S4 is deenergized with selector 142 (line L40) in "auto" the cups 66, 68 and 70 retract and expose the compacted masses 100.

Next, the "cycle start" push button (lines L20 and L31) is depressed and held closed until the press A closes on 1st automatic cycle, the following sequence of events occurring in the interim.

1. CHUTE ADVANCES a. The chute advance solenoid S6 (line L21) is energized through the normally closed 2CR contacts in line L22, through normally closed 4CR contacts (line L21), through chute "advance-retract" selector 146 whose manually operated contacts in line L21 are in normally closed position, through the normally closed 1CR contacts in line L20 via the held closed "cycle start" contacts in line L20, the closed "auto" contacts of selector switch 142 (line L18) and the closed contacts LS1 (line L18) of press open limit switch when the press is open. Accordingly, the chute D moves forwardly into the now open press A and trips "chute advance" limit switch LS4 (line L24) to closed position thereby energizing chute advance relay 1CR (line L24).

b. When the chute advance relay 1CR is energized, all 1CR contacts reverse, i.e., L18 opens, L20 opens but its L22 counterparts closes and shunts the "cycle start" contacts in line L20, L25 closes and holds across chute advance limit switch LS4, L26 closes, and L35 opens.

2. SHEAR ADVANCES

The "shear advance" solenoid S3 in line L26 becomes energized through the normally closed 2CR contacts in line 26, through the preform open limit switch LS6 contacts which are now closed in line L26, through the now closed 1CR contacts in line L26, and through the manual "shear advance-retract" push button 148 which is in normally closed retract position (line L26). The shear blades C1 therefore move downwardly to cut through the preformed wads 100 whereby they fall into the chute D and are conveyed to the respective mold cavities.

3. SHEAR RETRACTS

When the shear blades C1 advance downwardly into depressed position, shear advance limit switch LS8 in line L29 closes and immediately energizes shear advance relay 2CR in line L29. All 2CR contacts reverse, i.e., L19, L22 and L26 open, and L30, L31 and L50 close. Note that the now closed 2CR contacts in line L30 coupled in series with the now closed T2-2 timer contacts shunt across the shear advance limit switch LS8. However, the 2CR contacts which were previously closed in line L26 now open to immediately deenergize the "shear advance" solenoid S3 whereupon the shear blades C1 are mechanically retracted by a timed air return in cylinder 104.

4. CHUTE RETRACTS

When the shear blades return, limit switch LS9 in line 21 opens to deenergize the chute advance solenoid S6. Note that the 2CR contacts in line 22 remain open until timer T2 has been both actuated and thereafter has timed out. That is, timer T2-2 contacts in line L30 in combination with the now closed 2CR contacts in the same line keep the shear advance relay in line L29 energized.

5. PRESS CLOSES a. when chute D retracts, limit switch LS5 in line L31 is tripped closed whereupon clamp solenoid S2 is energized through ejection retract limit switch LS3 (now closed) through chute retract limit switch LS5 (now closed), through clamp position push button 150, which in "clamp open" position has its contacts closed, through the now closed 2CR contacts (L31) and the cycle start push button 144 which is still being held closed. The clamp movable platen 30 now begins to close. Accordingly, the press open limit switch LS1 (line L34) untrips to close the line L34 circuit and energize "screws delay" timer motor TM1 through its own contacts T1-1. At the same moment, the clutch coil TS1 (line L35) of the "screws delay" timer becomes energized to permit the timer T1 to start and run through its set time.

b. when timer T1 is running, its contacts T1-3 in line L37 close thereby energizing delay 3CR in the same reference line L37. Simultaneously, the 3CR contacts in line L38 close and hold across the timer T1-3 contacts. In addition, the 3CR contacts in line L32 now close and hold across the cycle start button 144 and allow the latter to release.

After the press A has begun to close following step 5 (b) above, the cycle becomes fully automatic.

6. PREFORM SECTION CLOSES

When the screws delay timer T1 has run through its set time, i.e., times out, the preform solenoid S4 becomes energized through the T1-4 contacts in line L39 via ejection advance limit switch LS2 and shear retract limit switch LS9. Accordingly, the cups 66, 68 and 70 move into contact with the nozzle faces on the respective extruders.

7. SCREWS ROTATE

When the preform cups abut against the extruder nozzles, preform close limit switch LS7 in line L48 is tripped closed thereby energizing "screws rotate" timer motor TM2 through its closed T2-1 contacts. Timer clutch coil TS2 is also energized to start the screws rotate timer T2 to run for its preset time. The No. 1, No. 2 and No. 3 screws forward solenoids will be energized during this period and hydraulic motors 47, 49 and 51 will turn the respective extruder screws. The period on timer T2 is set so that the cups will be filled to the amount desired. Completion of the time cycle opens up the T2-1 contacts in line L48 to stop the screws. In this regard, it is to be noted that the degree of plasticizing action upon the material in the extrusion cylinders is primarily determined by the annular gap between the nose of the screws and the orifice 62 rather than on the period of rotation of the screws.

8. PRESS OPENS a. When timer T2 times out its contacts T2-2 in line L30 open to deenergize the shear advance relay 2CR. Accordingly, all 2CR contacts reverse to their original position. Contact 2CR in line L31 opens to deenergize clamp close solenoid S2 thereby causing the press to open.

9. MOLDED PART EJECT

When the press is fully open, press open limit switch LS1 in line L18 trips closed to energize eject advance solenoid S1 through the now closed 3CR contacts and the normally closed 1CR contacts in line L18. The ejection pins 36 now advance to eject molded parts. Air blast solenoid S7 is also simultaneously actuated through the now closed 3CR contacts in line L19 and the normally closed 2CR contacts in the same line. A stream of air is directed against the molded parts from nozzles 134 and 136 to blow them into the conduit 40.

10. CHUTE ADVANCE

When the ejection pins 36 have fully advanced, eject advance limit switch LS2 (line L21) is tripped closed to energize chute advance solenoid S6. The chute D is thereby moved forwardly into the open molds preparatory to receiving the preformed wads 100 for conveyance into the mold cavities. It is to be observed that with top ejection, the air lines 134 abut up against the mold parts suspended from the lower ends of the ejection pins 36.

11. PREFORM OPENS

Simultaneously with the closing of the ejection advance limit switch LS2 in line L21, there is a corresponding opening of its counterpart LS2 contacts in line L39. Therefore, the preform solenoid S4 becomes deenergized and causes retraction of the cups 66, 68 and 70 away from the nozzle faces. Limit switch LS6 in line L26 now closes.

12. RESET SCREWS DELAY TIMER

When the chute D advances to its forward position, limit switch LS4 in line L24 is tripped to closed position whereby relay 1CR in the same line is energized. All 1CR contacts reverse. Since the normally closed 1CR contacts in line L35 are now open and since the limit switch LS1 in line L34 is open when the press is open, the clutch coil TS1 of the screws delay timer T1 is deenergized. Therefore, timer T1 is reset to change its respective contacts to "first" position. The T1-5 contacts in line L25 therefore close.

13. EJECTION PINS RETRACT

When the 1CR contacts in line L18 open as a result of actuation of the 1CR relay, both the ejection advance solenoid S1 (L18) and the air blast solenoid (L19) are deenergized.

Accordingly, the ejection pins 36 are retracted and the air blast is discontinued.

14. PREFORM COOL AND SHEAR ADVANCE

As a result of closing of the 1CR contacts in line L26, both the preform cool solenoid S5 in line L28 as well as the shear advance solenoid S3 in line L26 are energized. A stream of cool air is directed upon the respective cups in order to dissipate accumulated heat and inhibit sticking of plasticized material thereto on the next succeeding charging cycle. At the same time, the shear blades C1 are forced downwardly and cut off the now exposed compact wads 100 of plasticized mass so that they drop into the respective chute channels and tumble into the mold cavities 28A, 28B and 28C.

15. SHEAR RETRACT

Retraction of the shear blades C1 occur almost at the same time that the blades are depressed to their lowermost position. Thus, the shear advance limit switch LS8 is tripped closed at the bottom of the blade stroke to energize shear advance relay 2CR (line L29). All 2CR contacts reverse, including the 2CR contacts in line L30 which in series with the timer T2–2 contacts in line L30 shunts across limit switch LS8 to hold the 2CR relay. However, because the normally closed 2CR in line L26 have now opened, the shear advance solenoid S3 is deenergized, and the shear blades C1 are raised by a timed air return (not shown). Note also that the normally closed 2CR contacts open in line L19 to prevent actuation of the air blast solenoid S7 when the chute D returns.

16. CHUTE RETRACTS

When the shear blades retract, limit switch LS9 in line L21 opens to deenergize chute advance relay S6 whereupon the chute retracts from between the now open press platens 28 and 34. When the chute D returns, limit switch LS4 in line L24 opens to deenergize the chute advance relay 1CR. Also chute retract limit switch LS5 in line L31 is tripped closed to energize the clamp close solenoid S2. The press now closes to repeat the cycle from step 5 (PRESS CLOSES).

It is to be observed that a precautionary feature is incorporated in the circuit to prevent charging of the cups in the event that the press fails to close completely, for example, where a prior molded part, or flash or dirt is trapped between the mold surfaces. Referring to the press close limit switch LS10 in line L50, particles trapped between the platens prevent complete closure whereby LS10 fails to become untripped. Accordingly, flash thickness relay 4CR in line L50 becomes energized to reverse its contacts and opens its 4CR contacts in lines L21 and L47 and closes its alarm signal lamp 152 contacts in line L51. With the 4CR contacts in line L47 open the screw hydraulic motors 47, 49 and 51 cannot turn thereby avoiding the preparation of a hot charge until the trouble is cleared. In addition, the open 4CR contacts in line L21 prevent the chute from advancing and instituting another cycle. When the "screws rotate" timer T2 times out (even though the screws have not turned). The T2–2 contacts in line L30 open to disengage the relay 2CR thereby opening the 2CR contacts in line L31 which deenergizes clamp close solenoid S2 to open the press.

As is apparent from the foregoing description a unique method and apparatus is provided for a compression molding cycle whereby preplasticized preformed wads of thermosetting material are delivered to the mold cavities.

Figure 9:
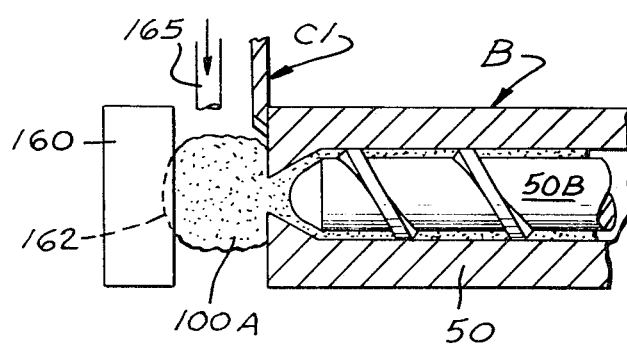
FIG. 9 is a side sectional view of a modification of the preforming die.
Figure 10:
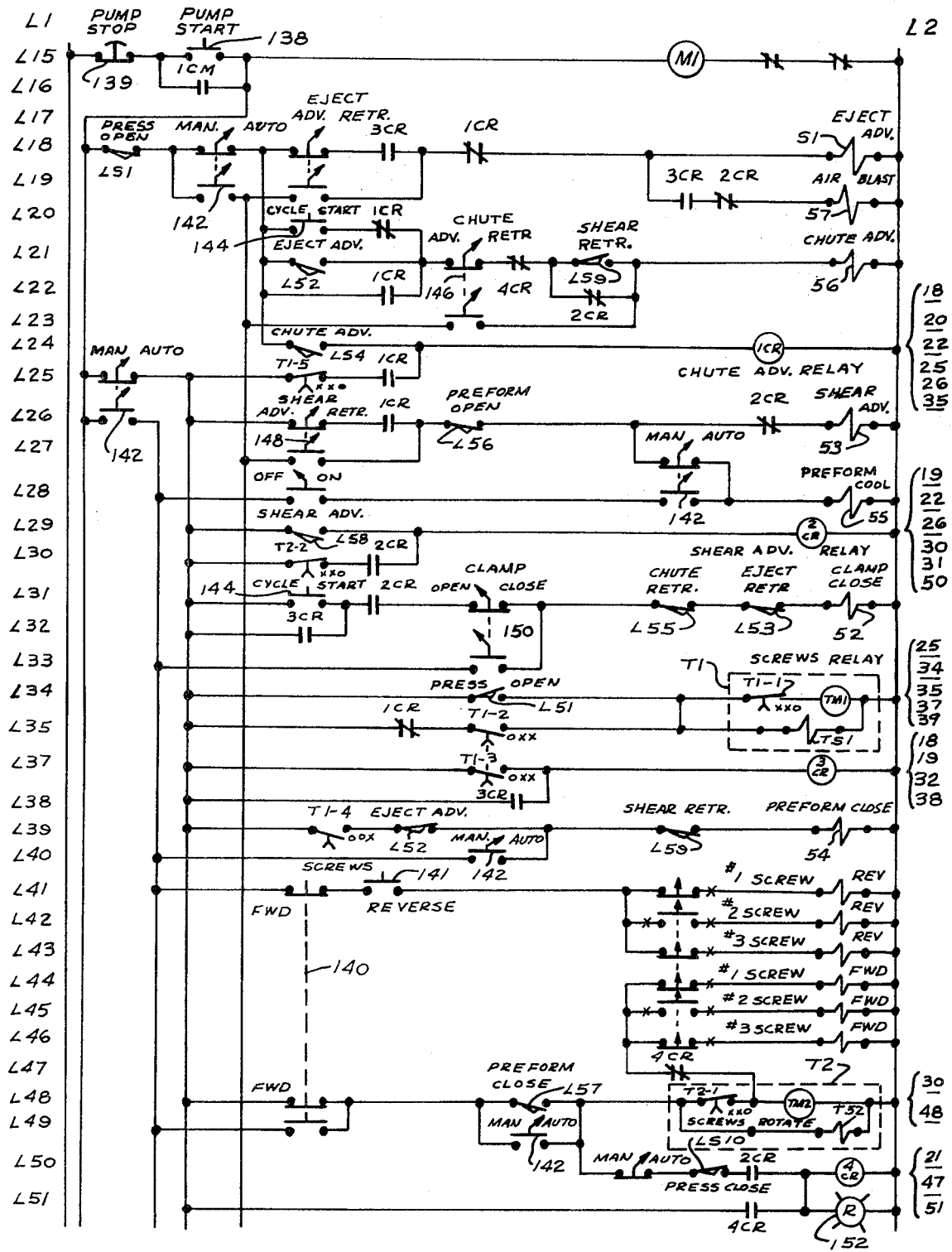
FIG. 10 is an across-the-line electrical schematic diagram of the electrical circuitry embodied in this invention.

In FIG. 9 there is shown a modified form of the foregoing system wherein the preplasticized charge from the extrusion cylinders B is merely delivered against a dished back-up plate 160 without completely compacting the extruded wad 100A. A concavity 162 in the face of the back-up plate 160 partially develop the wad 100A without completely forming it as do the preform cups 66, 68 and 70. In the modified form, there is no need to retract the back-up plate 160 thereby providing a simpler and less expensive mechanism. However, suitable means such as a warm air blast or presser finger 165 may be employed to push the formed mass 100A into the chute after the shear blades C1 have cut off the extrusion neck.

Temperatures as high as 290° F. can be achieved by combination of settings of the barrel resistance heaters and, more importantly, by the setting of the annular restriction at the tip or discharge end of the screw. This latter adjustment permits high frictional heat to be developed just as the material leaves the screw while the material laying on the flights of the screw before arriving at the annular restriction is at some lower and less critical temperature. During screw dwell periods, at which time the screw is at rest, the small amount of plasticized material remaining in the annular zone between the screw tip and the tapered orifice is of sufficiently thin section that its temperature will be reduced to safe levels by the close proximity to metal barrel and screw parts which are maintained at lower temperatures than that of fully plasticized molding materials.

Although this invention has been described in considerable detail such description is intended as being illustrative rather than limiting since the invention may be variously embodied, and the scope of the invention is to be determined as claimed.

What is claimed is:

1. In a compression molding press having a mold plunger reciprocable with respect to a mold cavity element, means for plasticizing a predetermined charge of thermosetting powder at an elevated temperature and expressing the plasticized charge through a nozzle as an elongate preheated extrusion, preforming means for constraining and cumulatively shaping the preheated extrusion into a generally compact bulbous mass, said preforming means being interposed adjacent the nozzle in the path of travel of said preheated extrusion, means for severing the preheated and preformed bulbous mass from the charge being expressed, and means for delivering the preheated and preformed mass to the mold cavity immediately prior to closure of the press whereby the compression molding cycle for thermosetting materials is appreciably shortened.

2. The invention of claim 1 wherein said means for delivering comprises a chute.

3. The invention of claim 1 wherein the mold cavity element includes a plurality of mold cavities, and said preforming means includes a shaping member for each cavity.

4. The invention of claim 2 wherein said means for severing comprises a blade for shearing the preheated preformed mass from the nozzle.

5. The invention of claim 4 wherein said preforming means comprises a cup which is reciprocable with respect to the nozzle.

6. The invention of claim 5 including means for ejecting the preformed mass from said cup upon retraction thereof from said nozzle.

7. The invention of claim 6 including means for cooling said cup upon retraction thereof from the preformed mass.

8. The invention of claim 6 including means for moving said chute between the mold plunger and mold cavity element immediately after the press opens, and means coupled with said chute for expelling finished molded parts from within the press.

9. The invention of claim 8 wherein said means for expelling comprises a stream of air.

10. The invention of claim 1 wherein the nozzle includes a restricted orifice annularly arranged with respect to the adjacent end of an extrusion screw so as to impart heat frictionally to the charge being extruded.

11. The invention of claim 10 wherein the annulus is adjustable.

12. The invention of claim 11 wherein the annulus is adjustable by longitudinally positioning the screw with respect to the orifice.

* * * * *